United States Patent [19]

Archerd

[11] 4,163,695
[45] Aug. 7, 1979

[54] FRACTIONATION PROCESS AND APPARATUS

[75] Inventor: Paul H. Archerd, Oklahoma City, Okla.

[73] Assignee: Phillips Petroleum Company, Bartlesville, Okla.

[21] Appl. No.: 829,751

[22] Filed: Sep. 1, 1977

[51] Int. Cl.² ............................................. B01D 3/14
[52] U.S. Cl. ........................................ 203/18; 203/82; 202/204
[58] Field of Search .................. 202/204; 203/18, 74, 203/81, 87, 82

[56] References Cited

U.S. PATENT DOCUMENTS

| | | | |
|---|---|---|---|
| 2,404,923 | 7/1946 | Patterson | 203/74 |
| 2,438,300 | 3/1948 | Schniepp | 202/42 |
| 2,476,206 | 7/1949 | McCants | 202/42 |
| 2,956,411 | 10/1960 | Gilmore | 62/20 |
| 3,100,680 | 8/1963 | Shaw et al. | 23/3 |
| 3,167,501 | 1/1965 | Woodle | 208/313 |
| 3,633,338 | 1/1972 | Zahn | 55/31 |
| 3,644,107 | 2/1972 | Clark | 48/190 |
| 3,822,193 | 7/1974 | Chapman | 203/39 |

FOREIGN PATENT DOCUMENTS 1074454 10/1954 France ........................................ 203/18

*Primary Examiner*—Hiram H. Bernstein

[57] ABSTRACT

An accumulator vessel is divided into two compartments by an overflow baffle divider and is used in combination with two fractionators. Overhead product from a first fractionator is passed into the first compartment of the accumulator. Liquids from the first compartment pass to the second fractionator as feed. Bottoms product from the second fractionator then passes to the second accumulator compartment from which it is passed as preferred reflux for the first fractionator.

14 Claims, 1 Drawing Figure

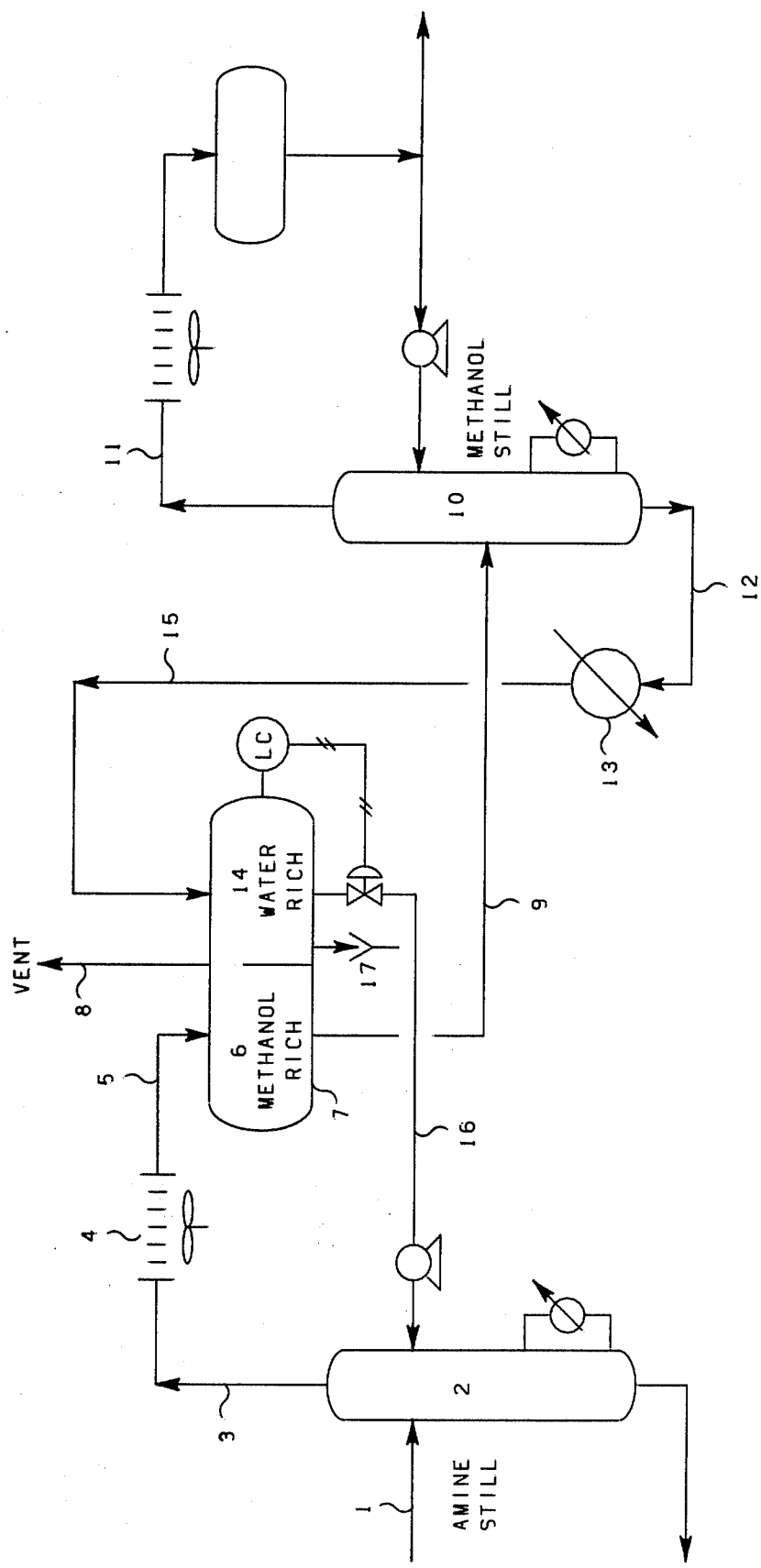

FRACTIONATION PROCESS AND APPARATUS

BACKGROUND OF THE INVENTION

This invention relates to a fractionation process. In another aspect, it relates to a fractionation process in which two fractionators and a common accumulator are used. In another aspect, it relates to such a fractionation process in which the overhead of one fractionator is used as the feed for the second and the bottoms product of the second fractionator is used as reflux for the first fractionator. In yet another aspect, this invention relates to a fractionation process in which a single vessel divided by a baffle is used to accumulate and distribute the reflux for the first fractionation and the feed charge for the second fractionator. In yet another aspect, this invention relates to a fractionation process used to separate alcohol from an alcohol-containing mixture. In yet another aspect, this invention relates to such a fractionation process for the separation of an amine-methanol mixture.

This invention also relates to the apparatus of a fractionation process. More specifically, this invention relates to a combined reflux accumulator and feed surge vessel in combination with two fractionators.

In a chemical process a tank or section with a fractionation column is often used for accumulating condensed vapor from a fractionation operation. These vessels are usually denominated as accumulators and are generally used when at least part of the accumulated condensate will be used as reflux in the fractionation operation. The material stored in the accumulator assures a ready supply of reflux for the distillation.

However, the condensed vapor from the fractionation operation can have valuable constituents in it which may be reused thereby making it desirable to obtain the constituents before using the condensed vapors as reflux. By removing the valuable constituent before the condensed vapor mixture is used as reflux reduces the amount of the valuable constituent that is distilled as overhead in the fractionator and leads to a more efficient and economical process.

The processing of raw natural gas is a good example of a process in which such a procedure would be advantageous. In the processing of raw natural gas it is common practice to provide means for preventing hydrate formation. If the gas is sour, that is, it contains acid gases such as hydrogen sulfide, carbon dioxide, and the like, it is also common practice to remove these components from the gas or the liquid products recovered from it prior to further processing or use. Therefore, where a sour gas has been treated by methanol injection to inhibit hydration formation and is further treated in an acid gas absorber for removal of acidic components such as $CO_2$, $H_2S$, and COS, and the like, rich solvent from the absorber contains the absorber solvent, acid gases, methanol, and water. It is generally economical to recover the methanol for reuse, therefore, when the rich solvent from the absorber is fractionated, and an overhead of methanol, water, and acid gases is obtained, it would be beneficial to subject the condensed methanol-water vapors to second fractionation to recover high purity methanol for reuse instead of using the condensed methanol-water vapors merely for reflux.

An object of the present invention, therefore, is to provide an efficient and economical fractionation process for separating a valuable constituent from a mixture.

More specifically, it is an object of this invention to provide an efficient and economical fractionation process for an amine-alcohol separation.

Another object of the present invention is to provide a fractionation process for separating a valuable constituent from a mixture that minimizes the vessels required for the process.

Another object of the present invention is to provide a fractionation process for separating a valuable constituent from a mixture that also minimizes the instrumentations to control the process.

Yet another object of the invention is to provide the apparatus for a fractionation process that is efficient, economical, and minimizes the vessels required as well as the instrumentations to control the process.

Still another object of the present invention is to provide an apparatus for an amine-alcohol separation process that is efficient, economical and minimizes the vessels required as well as the instrumentations to control the process.

Other objects, aspects, and the advantages of this invention will be readily apparent to those skilled in the art upon a study of this disclosure and the appended claims.

SUMMARY OF THE INVENTION

The present invention relates to a fractionation process and apparatus for separating and recovering desired constituents from a mixture. According to this invention, the mixture is distilled and the overhead vapors are condensed and passed to a first accumulating means. Liquid in the first accumulating means is then passed to a second fractionator to remove the constituent as overhead and pass the bottom products to a second accumulating means. The bottoms product, which is the overhead from the first fractionator less the desired constituent removed overhead in the second fractionator, is then used as reflux for the first fractionator.

The present invention is particularly applicable to acid gas absorbent (e.g., amines) and alcohol separation systems. The alcohol, water, and acid gases are the overhead from the first fractionator, the amine still, with the alcohol and water vapors condensed and the acid gases vented from the system. From the first accumulating means, the condensed alcohol and water vapors are passed to a second fractionator which yields the alcohol as overhead and the water as a bottoms product. The water is then passed to a second accumulating means from which it can be passed to the amine still, the first fractionator, as reflux. The desired constituent, the alcohol, has, therefore, been removed from the reflux and results in a more efficient and economical system as the alcohol has been recovered for reuse and the use of alcohol-free water to reflux the amine still reduces the amount of alcohol distilled overhead from the amine stripper.

The accumulating means for the condensed vapors of the first fractionator and the bottoms product of the second fractionator can be separate vessels connected by a conduit; however, a single vessel divided internally into two distinct compartments by a baffle is preferred. The use of the single, combined vessel adds to the efficiency and economics of the system by minimizing vessels as well as instrumentations to control the fractionation process.

BRIEF DESCRIPTION OF THE DRAWING

The drawing shows a preferred embodiment of the present invention, the fractionation system with a combined reflux accumulator and feed surge vessel.

DETAILED DESCRIPTION OF THE INVENTION

The present invention relates to a fractionation process and the apparatus for separating a valuable constituent from a mixture of at least three components. The mixture is distilled in a first fractionator to give overhead vapors of the desired constituent and at least one other component with at least one component of the mixture remaining as bottoms product. The overhead vapors are then condensed and passed to a first accumulating means. Any vapors or gases that were not condensed can be vented from the accumulating means so that only liquid is accumulated therein. The liquid is then passed to a second fractionator as feed. The desired constituent is taken as overhead and passed on to be reused or storage whereas the other components remain as bottoms product. The bottoms product is then passed to a second accumulating means. The liquid in the second accumulating means is used as reflux for the first fractionator, or some of the liquid can be discarded if an excess exists. The excess may be discarded through a drain in the bottom of the second accumulating means.

The two accumulating means can be two separate vessels with a conduit providing communication between the two accumulators. However, the preferred embodiment of this invention is the use of a single enclosed vessel divided internally into two distinct chambers by a baffle. The utilization of this combined reflux accumulator and feed surge vessel reduces the amount of equipment, piping, and controls necessary for the process to run effectively. The use of the combined reflux accumulator and feed surge vessel, therefore, is of great advantage to the system.

The combined reflux accumulator and feed surge vessel is preferably an enclosed vessel which is divided internally into two distinct chambers by a baffle. The baffle allows for overflow from one chamber into the other if an excess amount of liquid occurs in either compartment. The height of the baffle and the size of the chambers depend on the amount of liquids that are to be held in the compartments.

Each compartment of the combined reflux accumulator and feed surge vessel has an inlet means and an outlet means near the bottom of the compartment so that liquids may easily flow from the compartment through the outlet means. The inlet means of the first compartment is connected to the overhead product means of a first fractionator and the outlet means of the first compartment is connected to the feed inlet means of a second fractionator. The inlet means of the second compartment is connected to the bottoms product means of the second fractionator and the outlet means of the second compartment is connected to the reflux inlet means of the first fractionator. The second compartment can also have a second outlet means in order to remove any excess of liquid that may accumulate therein.

The combined reflux accumulator and feed surge vessel can also have a vent in order to vent any gases that were not condensed. The vent is located above the top of the baffle in order to allow for the venting of gases but not to allow the level of liquids in the vessel to reach the vent.

The instant invention is very useful where a sour gas which has been treated by methanol injection to inhibit hydration formation and is further treated in an acid gas absorber for removal of acidic components such as $CO_2$, $H_2S$, COS, and the like, or where natural gas liquids recovered from methanol-containing sour gases are so treated. The invention, in fact, is particularly applicable where any acid gas absorbent is used which contains some water which may be distilled out in the stripping or first fractionation step. This includes all the amines used for this purpose (e.g., monoethanolamine, diethanolamine, diisopropanolamine, and the like), as well as such solvents as sulfolane, sulfinol, N-methylpyrrolidone, tripotassium phosphate solutions, sodium carbonate solution, and the various glycol ethers. Rich solvent from the absorber passes to a solvent still (the first fractionator) where the acid gases, methanol, and some water are distilled overhead. Methanol and water are condensed and passed to the first compartment of a combined reflux accumulator and feed surge vessel with acid gases being vented therefrom. The condensed methanol-containing overhead is not used as reflux for the solvent still but passes directly to a methanol still from which methanol product is yielded overhead and water bottoms product is routed to the second compartment of the combined reflux accumulator and feed surge vessel. Any excess water in the system can be removed at this point. Most of the water from the second compartment is used as reflux for the solvent still (first fractionator). The use of methanol-free reflux for the solvent still increases the efficiency and economics of the system by facilitating the separation of methanol in the solvent still.

Should be imbalance occur in the system of the instant invention, the compartment in excess supply can overflow the baffle without causing an upset in the system. If the methanol-water in the first compartment overflows into the second compartment, a small amount of methanol would be fed back to the solvent still as reflux, but the system would not be greatly upset. If the water in the second compartment overflows into the first compartment, the overflow water would just be sent to the second fractionator, or methanol still, and return to the second compartment via bottoms product. An excess can easily be avoided in the second compartment by removing any excess water through a draining outlet.

The instant invention also allows one the flexibility of not running the second fractionator. For example, in the separation of methanol from an amine-methanol mixture, if it is not desired to run the methanol still, the combined reflux accumulator and feed surge vessel would act merely as a reflux accumulator. The methanol-water in the first compartment would overflow into the second compartment and thereby return to the first fractionator as reflux. Excess methanol-water mixture can be removed from the second compartment if desired.

The following illustrative embodiment will illustrate the present invention. The fractionation process is for the separation of a monoethanolamine-methanol system. The monoethanolamine was used as an absorbent for acidic gases. The following embodiments are not intended to limit the invention in any way and are only given for illustration.

Referring now to the single FIGURE drawing, a 30 weight percent aqueous monoethanolamine solution is used to absorb acidic components from a 16.7 l./min. natural gas liquids (NGL) stream containing 0.47 l./min. of methanol previously injected into the raw sour gas stream before condensation of the NGL therefrom. Amine solution circulation rate is 57.53 l./min. Rich amine 1 containing the acid components and the methanol is fed to an amine still 2 operating at 25 psia (0.17 MPa) and 230°–240° F. (110°–116° C.) to remove the methanol, acid gas components and some water overhead 3, the methanol and water being condensed 4 and passing the overhead via 5 to a first overhead accumulator compartment 6 of combined reflux accumulator and feed surge vessel 7. The first compartment 6 operates at conditions of 20 psia (0.14 MPa) and 130° F. (54° C.). Gases are vented from the accumulator through the vent 8. Methanol solution from the first accumulator compartment 6 is fed via 9 at a rate of 5.10 l./min. to the methanol still 10 operating at 25 psia (0.17 MPa) and 180°–240° F. (82°–116° C.) to remove an essentially pure methanol overhead 11 and a water bottoms product 12 which is cooled at heat exchanger 13 to about 130° F. (54° C.) and passed to the second compartment 14 of the combined reflux accumulator and feed surge vessel 7 via conduit 15. The water bottoms product in 14 is passed as reflux for the amine still via 16 or discarded via outlet 17.

The following material balance provides details for the flow rates. For simplicity, the acid gas components are omitted and only the water separated from the amine solution is indicated as a separate component.

| | Material Balance, l./min. | | | | | | | |
|---|---|---|---|---|---|---|---|---|
| | Rich Amine | Lean Amine | Amine Still Reflux | Amine Still Overhead | Methanol Still Feed | Methanol Still Reflux | Methanol Product | Water Recycle |
| Methanol | 0.47 | | | 0.47 | 0.47 | 5.10 | 0.47 | |
| Water | | | 4.30 | 4.30 | 4.63 | | | 4.63 |
| Amine Sol'n. | 57.53 | 57.53 | | | | | | |
| Totals | 58.00 | 57.53 | 4.30 | 4.77 | 5.10 | 5.10 | 0.47 | 4.63 |

Reasonable variations and modifications are possible within the scope of the foregoing disclosure and the appended claims to the invention.

I claim:

1. A method for accumulating and distributing the fluid streams for two fractionators comprising:
   (a) feeding at least partially condensed overhead from a first fractionation column into a first chamber within an enclosed vessel divided internally into a first and second chamber by a baffle wherein said baffle allows overflowing from one chamber to the other;
   (b) passing that amount of liquid in the first chamber to the second chamber which accumulates in said first chamber in an amount sufficient to overflow into the second chamber;
   (c) passing liquid from said first chamber of said enclosed vessel as feed to a second fractionator;
   (d) feeding the bottoms liquid from the second fractionator into the second chamber of the enclosed vessel in (a);
   (e) passing liquid from said second chamber of enclosed vessel to said first fractionator of (a) as reflux; and
   (f) in the event that said second fractionator is shut down and the first fractionator continues operation, the overhead from the first fractionator accumulates in the first chamber of the enclosed vessel, overflows into the second chamber of the enclosed vessel, and is then returned to said first fractionator as reflux.

2. A method as in claim 1 wherein:
   the overhead in (a) is condensed before passing into said first chamber; and
   any uncondensed gases are vented from the enclosed vessel in (a).

3. A method as in claim 1 wherein:
   said overhead in (a) comprises acid gases, an alcohol, and water;
   said liquid in (b) comprises an alcohol and water; and
   said bottoms liquid in (c) comprises water.

4. A method as in claim 3 wherein:
   said alcohol is methanol and said acid gases are selected from the group consisting of $CO_2$, $H_2S$, and COS.

5. A process for separating an alcohol from an alcohol-containing mixture comprising the steps of:
   (a) distilling the alcohol-containing mixture;
   (b) passing the overhead of the distillation in (a) to the first compartment of an accumulator which is divided into a first and second compartment by a baffle wherein said baffle allows overflowing from one chamber to the other;
   (c) passing that amount of accumulated overhead in the first compartment to the second compartment which accumulates in said first compartment in an amount sufficient to overflow into the second chamber;
   (d) passing the liquid in said first compartment of (b) to an alcohol still to be distilled;
   (e) passing the bottoms product of said still of (d) to the second compartment of the accumulator in (b);
   (f) passing the liquid in the second compartment of the accumulator to the distillation of (a) as reflux; and
   (g) in the event that said alcohol still is shut down and the distillation of (a) continues in operation, the overhead from the distillation accumulates in the first compartment and overflows into the second compartment with liquid from the second compartment being returned to the distillation of (a) as reflux.

6. A process as in claim 5 wherein the alcohol-containing mixture comprises an alcohol and an acid gas absorbent.

7. A process as in claim 6 wherein:
   said acid gas absorbent is selected from the group consisting of an amine, sulfolane, sulfinol, N-methylpyrrolidone, tripotassium phosphate solutions, sodium carbonate solutions, and glycol ethers;

condensing the overhead of the distillation in (a);

venting from the accumulator any uncondensed gases or vapors; and the overhead of the distillation in (a) comprises acid gases, alcohol, and water.

8. A process as in claim 6 wherein the alcohol is methanol; the acid gas absorbent is an amine; the liquid in (c) comprises methanol and water; and the bottoms product of (d) and the liquid in (e) are predominantly water.

9. A process as in claim 5 wherein each of the two compartments of said accumulator are replaced with a separate vessel and said vessels are connected with an overflow conduit to allow overflowing from one vessel to the other.

10. A method as in claim 1 wherein two separate vessels replace the two distinct chambers within said enclosed vessel divided internally by a baffle and said separate vessels are connected with overflow conduit to allow overflowing from one vessel to the other.

11. An apparatus for accumulating and distributing fluid process streams for two fractionators comprising in combination:
   (1) a combined reflux accumulator and feed surge vessel comprising:
      (a) a closed vessel divided internally by a baffle into a first and second chamber wherein said baffle allows overflowing from one chamber to the other,
      (b) an inlet means into the first chamber of the vessel,
      (c) an inlet means into the second chamber of the vessel,
      (d) an outlet means from the first chamber of the vessel in position below the top of the baffle, and
      (e) an outlet means from the second chamber of the vessel in a position below the top of the baffle;
   (2) a first fractionation column with reflux inlet means connected to the outlet means of the second chamber of the combined reflux accumulator and feed surge vessel and with overhead product means connected to a condensing means which is connected to the inlet means of the first chamber of the combined reflux accumulator and feed surge vessel;
   (3) a second fractionation column with feed inlet means connected to the outlet means of the first chamber of the combined reflux accumulator and feed surge vessel and with bottoms product means connected to the inlet means of the second chamber of the combined reflux accumulator and feed surge vessel;
   (4) means to shut down the second fractionator and thereby allow overhead from the first fractionator to accumulate in said first chamber, overflow into said second chamber, and then pass to the first fractionation column as reflux via the connection between the outlet means of the second chamber and the reflux inlet means of the first fractionator.

12. An apparatus of claim 12 wherein there is also provided an outlet means from the combined reflux accumulator and feed surge vessel which is in a position above the top of the baffle in order to allow the venting of gases.

13. An apparatus of claim 11 wherein there is also provided a second outlet means from the second chamber of the combined reflux accumulator and feed surge vessel disposed in relation to the first outlet means to allow separate withdrawal of liquids from the second chamber.

14. An apparatus for accumulating and distributing fluid process streams for two fractionators comprising in combination:
   (1) a first vessel with an inlet and an outlet means;
   (2) a second vessel with an inlet and an outlet means;
   (3) a first fractionation column with reflux inlet means connected to the outlet means of the second vessel and with overhead product means connected to a condensing means which is connected to the inlet means of the first vessel;
   (4) a second fractionation column with feed inlet means connected to the outlet means of the first vessel and with bottoms product means connected to the inlet means of the second vessel;
   (5) overflow conduit means connecting the first and second vessel to thereby allow passage into the second vessel of that amount of liquid in the first vessel which accumulates in said first vessel in an amount sufficient to overflow into the second vessel; and
   (6) means to shut down the second fractionator and thereby allow overhead from the first fractionator to accumulate in said first vessel, overflow into said second vessel and then pass to the first fractionator column as reflux via the connection between the outlet means of the second chamber and the reflux inlet means of the first fractionator.

* * * * *